United States Patent
Rettig et al.

(10) Patent No.: US 9,429,130 B2
(45) Date of Patent: Aug. 30, 2016

(54) VOLTAGE CONTROL IN A VEHICLE ELECTRICAL SYSTEM

(75) Inventors: Rasmus Rettig, Hamburg (DE); Werner Schiemann, Fellbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 658 days.

(21) Appl. No.: 13/878,840

(22) PCT Filed: Sep. 9, 2011

(86) PCT No.: PCT/EP2011/065677
§ 371 (c)(1),
(2), (4) Date: Jun. 14, 2013

(87) PCT Pub. No.: WO2012/048969
PCT Pub. Date: Apr. 19, 2012

(65) Prior Publication Data
US 2013/0249285 A1      Sep. 26, 2013

(30) Foreign Application Priority Data
Oct. 13, 2010   (DE) .................. 10 2010 042 396

(51) Int. Cl.
*B60L 1/00*      (2006.01)
*B60L 3/00*      (2006.01)
(Continued)

(52) U.S. Cl.
CPC ............. *F02N 11/08* (2013.01); *H02P 1/04* (2013.01); *F02N 2200/044* (2013.01); *F02N 2250/02* (2013.01)

(58) Field of Classification Search
CPC .......... H02J 5/005; H02J 17/00; H02J 7/025; H02J 3/32; H02J 7/35; H02J 7/0068; H02J 7/007; H02J 4/00; H02J 7/34; H02J 11/00; H02J 13/0024; H02J 1/12; H02J 1/14; H02J 2001/004; H02J 2007/004

USPC .................................................. 307/10.6, 9.1
See application file for complete search history.

(56) References Cited

U.S. PATENT DOCUMENTS

| 4,228,779 | A | * | 10/1980 | Wetzel | ................. | F02P 3/051 |
| | | | | | | 123/146.5 A |
| 5,970,936 | A | * | 10/1999 | Cabrera | .............. | F02N 11/0848 |
| | | | | | | 123/179.3 |

(Continued)

FOREIGN PATENT DOCUMENTS

| CN | 1187582 A | 3/2004 |
| DE | 10 2010 046232 | 5/2011 |

(Continued)

OTHER PUBLICATIONS

International Search Report for PCT/EP2011/065677, dated Mar. 29, 2012.

*Primary Examiner* — Jared Fureman
*Assistant Examiner* — Esayas Yeshaw
(74) *Attorney, Agent, or Firm* — Norton Rose Fulbright US LLP (57) ABSTRACT

A method for maintaining a predetermined voltage in a battery-supported vehicle electrical system during the operation of an electrical starter includes steps of operating the electrical starter on the vehicle electrical system during a first time phase in series with a limiting resistor, in order to limit the current flowing through the starter, and operating the electrical starter on the vehicle electrical system during a second time phase with a reduced limiting resistance, in order to increase a power converted by the starter. A transition from the first time phase to the second time phase is controlled on the basis of electrical parameters sampled during the first time phase at the limiting resistor.

14 Claims, 4 Drawing Sheets

(51) Int. Cl.
*H02G 3/00* (2006.01)
*F02N 11/08* (2006.01)
*H02P 1/04* (2006.01)

(56) References Cited

U.S. PATENT DOCUMENTS

| | | | |
|---|---|---|---|
| 6,018,200 A * | 1/2000 | Anderson | B23K 9/1062 290/1 A |
| 6,335,609 B1 | 1/2002 | Amey et al. | |
| 6,388,447 B1 * | 5/2002 | Hall | H02J 7/0047 324/426 |
| 8,896,140 B2 * | 11/2014 | Venkatasubramaniam | F02N 11/0859 290/31 |
| 2009/0315328 A1 * | 12/2009 | Kumar | B60L 11/08 290/10 |

FOREIGN PATENT DOCUMENTS

| | | |
|---|---|---|
| EP | 1 041 277 | 10/2000 |
| JP | 2007-285172 | 11/1992 |
| JP | 2009-2195 | 1/2009 |
| JP | 2009-287459 | 12/2009 |

\* cited by examiner

VOLTAGE CONTROL IN A VEHICLE ELECTRICAL SYSTEM

BACKGROUND OF THE INVENTION

1. Field of the Invention

The present invention relates to a method and a device for maintaining a predetermined voltage in a battery-supported vehicle electrical system.

2. Description of the Related Art

An internal combustion engine of a motor vehicle is generally started with the aid of an electrical starter. The power required for operating the starter is withdrawn from a battery of the vehicle electrical system of the motor vehicle. A vehicle system voltage may drop so much due to the load of the battery by the starter during the starting procedure that other consumers in the vehicle electrical system are not supplied with sufficient voltage. In particular, a consumer controlled by a microprocessor may react sensitively to an excessively low vehicle system voltage and may not function or may only function restrictedly for a predetermined time span. The consumer may be a control unit which is relevant for the operation and/or the safety of the motor vehicle.

If the motor vehicle is equipped with a start-stop mechanism, which already shuts down the internal combustion engine during a short stop and only restarts it when needed, starting procedures may be relatively frequent during travel of the motor vehicle and temporary failures of a consumer may be particularly serious. The present invention is therefore based on the object of providing a method and a device for ensuring a predetermined vehicle system voltage during a starting procedure.

BRIEF SUMMARY OF THE INVENTION

A method according to the present invention for maintaining a predetermined voltage in a battery-supported vehicle electrical system during the operation of an electrical starter includes steps of operating the electrical starter on the vehicle electrical system during a first time phase in series with a limiting resistor, in order to limit the current flowing through the starter, and operating the electrical starter on the vehicle electrical system during a second time phase with a reduced limiting resistance, in order to increase a power converted by the starter. A transition from the first time phase to the second time phase is controlled on the basis of electrical parameters sampled at the limiting resistor during the first time phase.

In this way, it may be ensured that the reduction of the limiting resistance occurs at an optimized point in time, i.e., as early as possible to maximize the power converted by the starter and thus to accelerate the starting procedure, and simultaneously as late as necessary, to avoid a drop of the battery voltage below a predetermined value. Through the control as a function of values detected individually during each starting procedure, variable influencing variables may be taken into consideration, such as a mechanical resistance of the internal combustion engine at different temperatures, aging and temperature influences on the battery, and a power withdrawal by further consumers.

During the first phase, a threshold value may be determined and the second phase may be initiated when the current flowing through the limiting resistor falls below the determined threshold value. The initiation of the second phase or the reduction of the limiting resistance may thus be carried out on the basis of a relatively simple determination.

The determination of the threshold value is advantageously carried out on the basis of measurements, which are collected at predetermined points in time, in order to minimize both inductive influences and also a variable counter electromotive force of the starter during the measuring period of time. The points in time are based on inductances of lines and the speed of the increase of the counter electromotive force during the starting procedure.

The method may be carried out on the basis of a plurality of measurements which are rectified with respect to time, in order to determine the optimized changeover point in time first coarsely and then more and more finely.

In an alternative specific embodiment for the determination and monitoring of a threshold value for the current, the method may include steps of determining a point in time on the basis of voltage measurements at the limiting resistor during the first phase; and initiating the second phase when the determined point in time is reached. This determination may be carried out on the basis of differential equations and may allow a prognosis of the optimized changeover point in time, without having to monitor the current flowing through the starter.

A device according to the present invention for maintaining a predetermined voltage in a battery-supported vehicle electrical system during the operation of an electrical starter includes a controllable limiting resistor for operating the starter on the vehicle electrical system in series with the resistor, a first sampling unit and a second sampling unit for recording voltages at different terminals of the resistor, a timer, and a control unit for reducing the limiting resistance in accordance with the above-described method.

The device allows the optimized transition from the first phase into the second phase, without requiring sensors, which are to be attached at a distance to the limiting resistor.

DETAILED DESCRIPTION OF THE INVENTION

Figure 1:
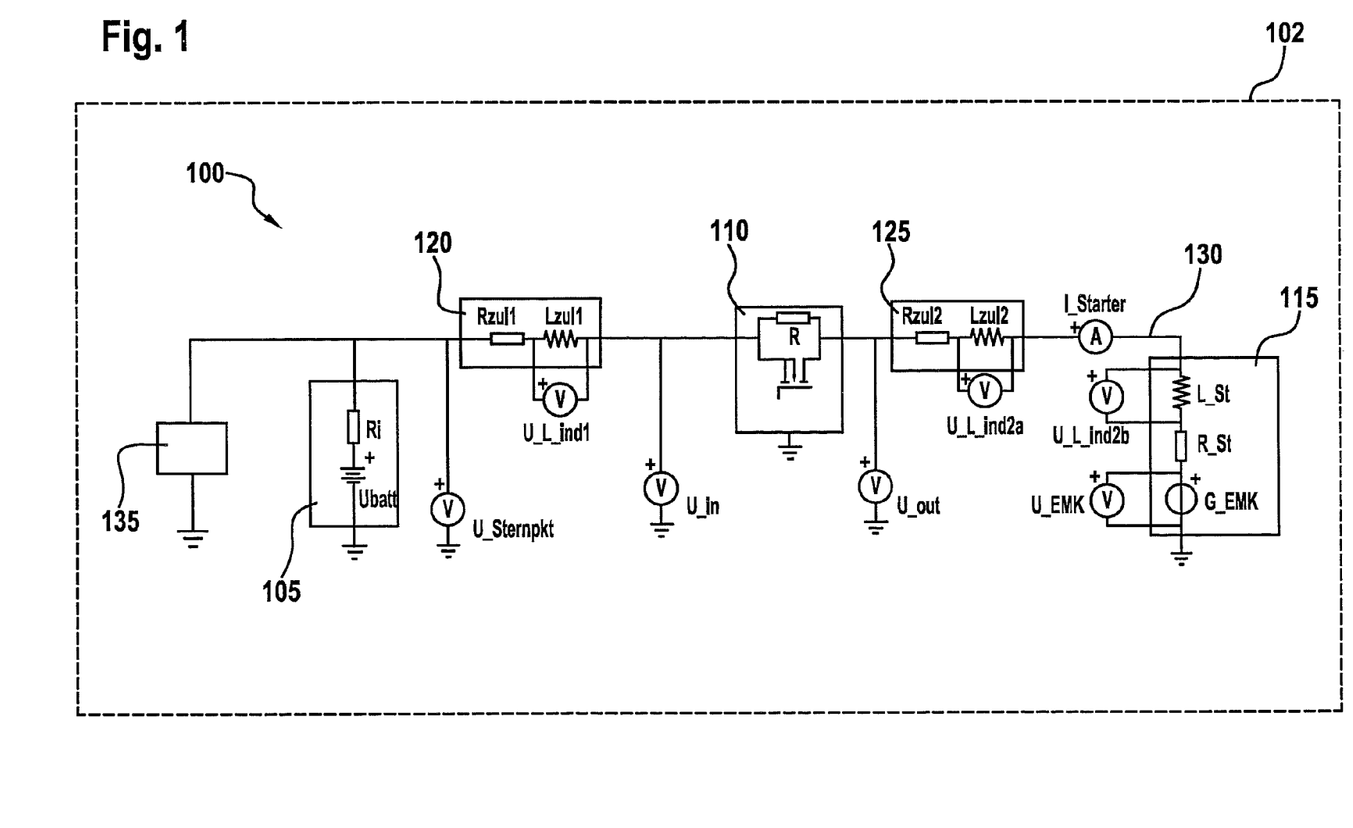
FIG. 1 shows a circuit diagram of a vehicle electrical system in a motor vehicle.

FIG. 1 shows a circuit diagram of a vehicle electrical system 100 in a motor vehicle 102. Vehicle electrical system 100 includes a battery 105, a limiting resistor 110, a starter 115, and a first line 120 from battery 105 to limiting resistor 110 and a second line 125 from limiting resistor 110 to starter 115. A starter relay 130 is incorporated in second line 125. Furthermore, a consumer 135, which may be representative for a number of different consumers, is connected in parallel to battery 105.

Consumer 135 is operated in vehicle electrical system 100 and requires the provision of an operating voltage for this purpose, which may not fall below a predetermined threshold value. For example, consumer 135 may include an electronic or microprocessor-controlled component, which resets (executes a reset) after the supply voltage falls below the threshold value, and then requires a certain reset time to be ready for use again. It is the object of the present invention to prevent a voltage drop at battery 105 below this threshold value.

Motor vehicle 102 includes an internal combustion engine (not shown), which may be started with the aid of starter 115. When internal combustion engine is running, it drives a generator (also not shown), which charges battery 105. During a starting procedure of the internal combustion engine, however, the generator is not in operation or only causes a negligible charge of battery 105.

In order to start the internal combustion engine, starter relay 130 is closed, so that starter 115 is connected essentially in parallel to battery 105. Starter 115 includes a high-performance DC electric motor, which then begins to rotate at increasing speed. The electric motor drives the internal combustion engine until it starts. At the latest when the internal combustion engine is running, starter relay 130 is opened and starter 115 gradually comes to a standstill. A starting procedure generally last several seconds, although only a short first phase of the starting procedure is considered hereafter.

Immediately after the closing of starter relay 130, stationary starter 115 has a counter EMF close to zero, so that a large current flows in a circuit 140 from battery 120 through first line 120, limiting resistor 110, second line 125, starter relay 130, and starter 115. Since battery 105 has an internal resistance not equal to zero, the vehicle system voltage available at its terminals drops as a function of the flowing current, so that the risk exists that consumer 135 will reset.

It is known that the drop of the vehicle system voltage may be reduced in that limiting resistance 110 is set to a predetermined value greater than 0Ω. In order to maximize the power converted by starter 115 for the starting procedure, limiting resistance 110 may be reduced after a predetermined time. A point in time at which limiting resistance 110 may be reduced without the vehicle system voltage falling below the predetermined threshold value is generally determined once within the scope of a conception of vehicle electrical system 100 and is no longer changed thereafter. A reduction of limiting resistance 110 on the basis of measurements in the area of battery 105 requires measuring units, which are to be avoided as much as possible for reasons of cost.

If limiting resistance 110 is reduced excessively early or excessively strongly, the risk of collapse of the vehicle system voltage exists, so that consumer 135 resets. If limiting resistance 110 is reduced excessively late or excessively little, however, the power converted by starter 115 is not maximized, so that the starting procedure of the internal combustion engine may be impaired or lengthened.

In order to observe the occurring sequences in detail during a starting procedure more precisely, battery 105, limiting resistor 110, starter 115, and lines 120 and 125 are shown as replacement circuit diagrams in FIG. 1, which include ohmic resistors, inductors, and a voltage source.

Battery 105 provides a voltage Ubatt; an internal resistance of battery 105 is Ri. First line 120 includes an internal resistance Rzul1 and an inductance Lzul1. Limiting resistance 110 is R, the limiting resistance being variable, for example, using a semiconductor or an electromechanically controlled switch, between two or more values R1, R2, ..., and R1>R2> .... Last used resistance value Ri may be zero or approximately zero. Second line 125 includes an internal resistance Rzul2 and an inductance Lzul2. Starter 115 includes an inductance L_St, an internal resistance R_St, and a voltage source G_EMK, whose provided voltage corresponds to the counter induced voltage (counter electromotive force, counter EMF) of the starter and is dependent on the rotational speed of the starter and counteracts battery voltage U_batt.

Starter relay 130 is assumed to be ideal or its electrical resistance in the closed state is modeled by second line 125. Connections which go to ground are also assumed to be ideal or modeled in remaining circuit 140.

The following values are assumed as examples in vehicle electrical system 100:

Ri 6 mΩ
Rzul 2 mΩ
Lzul1 5 uH
Rzul2 5 mΩ
Lzul2 1 uH
L_St 4.3 uH
R_St 1.75 mΩ
G_EMK time-dependent, see text Voltmeters with indications of voltages are shown in FIG. 1. The voltmeters indicate at which point in vehicle electrical system 100 which voltage is applied. This is accordingly true for an ammeter in the area of starter relay 130.

Figure 2:
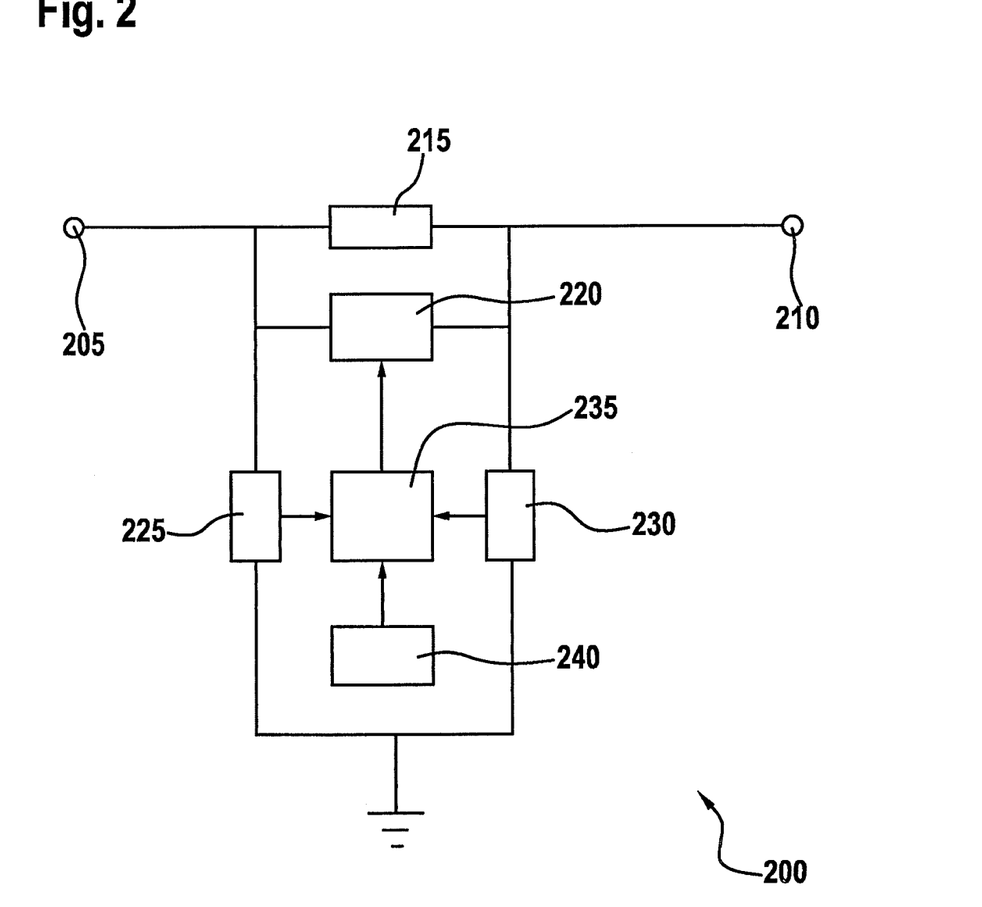
FIG. 2 shows a current controller for use in the vehicle electrical system of FIG. 1.

FIG. 2 shows an integrated current controller 200 for use in the place of limiting resistor 110 in FIG. 1. Current controller 200 includes a first terminal 205 for connection to first line 120 and a second terminal 210 for connection to second line 125. A limiting resistance 215, which may be selectively reduced to zero with the aid of a controllable switch 220, is situated between terminals 205 and 210. Voltages between terminals 205 and 210 and ground are recorded with the aid of voltmeters 225 and 230, respectively, and provided to a control unit 235. Control unit 235 is connected to a timer 240 and configured for the purpose of controlling switch 220. Timer 240 is configured for the purpose of providing a time normal for determining times or time intervals between events, in particular measurement points in time for voltmeters 225 and 230.

In the illustration of FIG. 2, limiting resistance 215 or the zero resistance lies between terminals 205 and 210 depending on the position of switch 220. In other specific embodiments, multiple limiting resistors 215 and optionally also multiple switches 220 may be provided, to set multiple different electrical resistances between terminals 205 and 210. In one specific embodiment, the resistor lying between terminals 205 and 210 is implemented by a semiconductor arrangement, which is preferably continuously controlled by control unit 235.

Figure 3:
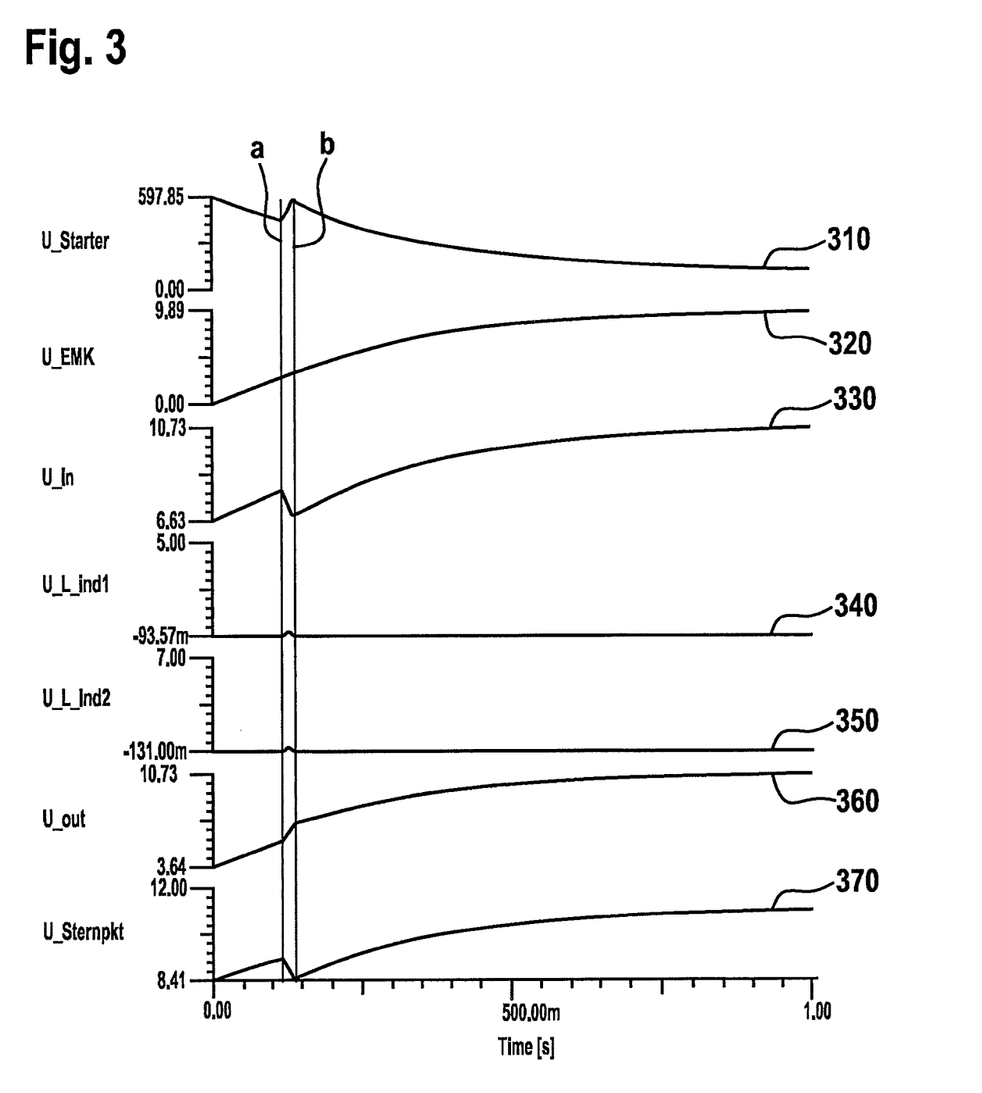
FIG. 3 shows curves of voltages and currents in the vehicle electrical system of FIG. 1.

FIG. 3 shows curves of voltages and currents in the vehicle electrical system from FIG. 1. A time is plotted in a horizontal direction and curves 310 through 370 of a current or various voltages are plotted in the vertical direction.

First curve 310 describes current I_Starter through starter 115. As is apparent from FIG. 1, the same current I_Starter flows through all branches of circuit 140 at every point in time, since this is a pure series circuit. At point in time 0, the starting procedure is initiated, in that starter relay 130 is closed. I_Starter increases rapidly to almost 600 A and drops therefrom in accordance with a logarithmic function. A variable mechanical resistor of the internal combustion engine may result in a superimposed periodic variation of starter current I_Starter and is not considered in the present consideration. At point in time a at approximately 130 ms, limiting resistance 110 is reduced to 0. I_Starter subsequently increases again, until point in time b at approximately 140 ms, to almost 600 A and again drops logarithmically. Current I_Starter flowing through starter 115 is primarily dependent on the rotational speed of starter 115.

With increasing rotational speed, the voltage drop at starter 115 also increases and the current flowing through starter 115 decreases.

Lowermost curve 370 describes voltage U_Sternpkt at battery 105, which is also the supply voltage of consumer 135. At the beginning of the starting procedure, U_Sternpkt is 12 V and then drops rapidly to approximately 8.4 V. U_Sternpkt subsequently increases essentially inversely proportionally to I_Starter and reaches approximately 9.2 V at point in time a. Between points in time a and b, U_Sternpkt decreases again to approximately 8.4 V and then increases again essentially inversely proportionally to I_Starter.

Second curve 320 from the top in FIG. 3 describes counter EMF G_EMK, which arises during operation of starter 115 and is dependent on the rotational speed of starter 115. G_EMK increases logarithmically to approximately 8 V, the increase being uniform enough to be considered to be linear in a sufficiently short phase.

Third curve 320 from the top in FIG. 3 describes input voltage U_in, which is measurable in relation to ground at a point between first line 120 and limiting resistor 110. U_in is the voltage which voltmeter 225 samples in FIG. 2. Sixth curve 360 from the top in FIG. 3 describes output voltage U_out, which is measurable in relation to ground at a point between first line 120 and limiting resistor 110. U_out is the voltage which voltmeter 230 samples in FIG. 2.

U_in and U_out qualitatively follow U_Sternpkt, in that they drop rapidly at point in time 0 from a value close to the no-load voltage of battery 105 and then increase logarithmically until point in time a, drop again until point in time b and then again increase logarithmically.

Fourth curve 340 from the top in FIG. 3 describes first induced voltage U_L_ind1 at inductance L_zul1 of first line 120 in FIG. 1. In a corresponding way, fifth curve 350 from the top in FIG. 3 describes second induced voltage U_L_ind2 at inductance L_zul2 of first line 120 in FIG. 1. Both induced voltages U_L_ind are only positive in each case in a short time phase after a change of current I_Starter. These time phases are proportional to the absolute values of inductances Lzul1 and Lzul2 and resistances Rzul1 and Rzul2, respectively, corresponding thereto. The time phases each begin at points in time a and b.

Induced voltages U_L ind1 at inductance L_zul1 and U_L_zul2 at inductance L_zul2 decay enough within a comparatively short time that they are negligibly small in relation to the other voltages of circuit 140. For the assumed values of the elements in FIG. 1, this is the case after approximately 2-4 ms. After decay of the inductance effects, U_L_zul1, U_L_zul2, and U_L_St are each approximately 0, so that L_zul1, L_zul2, and L_St are no longer taken into consideration.

It is explained hereafter how, on the basis of measurements at limiting resistor 110 during the first phase, i.e., while limiting resistance 110 assumes a first predetermined value R1 greater than zero, a threshold value I_switch may be determined, which current I_Starter must fall below before limiting resistance 110 may be reduced to a second predetermined value R2, without voltage U_Sternpkt dropping by more than a predetermined extent. Specified times are determined from the closing of starter relay 130 at point in time 0. If limiting resistance 110 is to be reduced step-by-step in more than two phases, the determination specified hereafter may thus accordingly be carried out iteratively.

Current I_Starter flowing through circuit 140 may be determined as follows by measurements of U_in and U_out at limiting resistor 110:

$$I_{starter} = \frac{U_{out} - U_{in}}{R1}.$$

Circuit 140 may be divided into an input circuit, which is composed of battery 105 and first line 120, and an output circuit, which is composed of limiting resistor 110, second line 125, and starter 115.

Before counter EMF G_EMK in the output circuit becomes noticeably large, in that it reaches a value greater than approximately 100 mV, which occurs approximately at the point in time 4 ms in the case of the above-specified values, the output circuit is determined as:

$$U_{out} = (R_{zul2} + R_{St}) \cdot I_{Starter}.$$

In this case:

$$I_{starter} = \frac{U_{out} - U_{in}}{R1}$$

After sufficient decay of second induced voltage U_L_Ind2, in the case of the above-assumed values approximately 2.5 ms after the beginning of the starting procedure, the input circuit is determined at two successive points in time as:

$$U_{Batt} = I_1 \cdot (R_i + R_{zul1}) + U_{1in}$$

and:

$$U_{Batt} = I_2 \cdot (R_i + R_{zul1}) + U_{2in}.$$

First measurement U_1in may coincide with the measurement of U_in, which is carried out to determine the output circuit. Second measurement U_2in takes place at the greatest possible time interval from the first measurement, to increase the precision of the method, but at the same time early enough so it does not lie after the optimized changeover point in time. In the case of the above-specified values, a time interval of approximately 5-50 ms between the measurements U_1in and U_2in is meaningful, preferably 15-30 ms, more preferably approximately 20 ms.

When subtracted from one another, the last two formulas result in:

$$(I_2 - I_1) \cdot (R_i + R_{zul1}) = U_{1in} - U_{2in}$$

Furthermore:

$$U_{Sternpkt} = U_{Batt} - I \cdot R1 \text{ or } I = (U_{batt} - U_{Sternpkt})/R_i$$

Ri may be dependent on employed battery 105 or a battery type as the maximum value.

In summary:

$$U_{batt} = I \cdot (R_i + R_{zul1} + R1 + R_{zul2} + R_{St}) + U_{EMK}$$

If two measurements of U_in or U_out are carried out at a short time interval (see above), so that counter EMF G_EMK between the measurements may be considered to be constant, the following applies:

$$I_1 \cdot (R_i + R_{zul1} + R1 + R_{zul2} + R_{St}) = I_2 \cdot (R_i + R_{zul1} + R2 + R_{zul2} + R_{St})$$

The current through starter 115 in the second phase, after the reduction of limiting resistance 110 from R1 to R2, is thus assessed as:

$$I_2 = I \cdot (R_i + R_{zul1} + R1 + R_{zul2} + R_{St})/(R_i + R_{zul1} + R2 + R_{zul2} + R_{St}).$$

At the optimized point in time of the reduction, therefore:

$$I_{decrease} = \left(\frac{U_{batt} - U_{Sternpkt}}{R_i}\right) \cdot \frac{(R_i + R_{zul1} + R2 + R_{zul2} + R_{St})}{(R_i + R_{zul1} + R1 + R_{zul2} + R_{St})}.$$

As already stated, in the above formulas, terms $R_i$–$R_{zul1}$ may each be replaced by $$\frac{U_{1in} - U_{2in}}{I_2 - I_1}.$$

Term $U_{batt}$–$U_{Sternpkt}$ specifies the absolute value by which battery voltage U_batt may drop at most upon closing of starter relay 130. Ohmic resistance R_zul1 of first line 120 may be determined once, for example, within the scope of a conception of motor vehicle 102.

On the basis of measurements of voltages U_in or U_out at limiting resistor 110 at predetermined points of time, current I_decrease may thus be determined, which flowing current I must fall below before limiting resistance 110 is reduced from R1 to R2.

Instantaneously flowing current I may be determined continuously or periodically with the aid of measurements of U_in and U_out and it may be checked whether the following applies:

$$I_1 < I_{decrease} \Leftrightarrow \frac{U_{out} - U_{in}}{R1} < I_{decrease}.$$

In the described way, the reduction of limiting resistance 110 from R1 to R2 may be carried out or signaled at the optimum point in time simply and reliably, i.e., as early as possible without neutral point displacement voltage U_Sternpkt dropping more than predefined by $U_{batt}$–$U_{Sternpkt}$. Limiting resistance 110 may be reduced to a positive value or to zero. A further step-by-step reduction of limiting resistance 110 in a corresponding way is possible. In still another specific embodiment, the reduction may also take place continuously. Device 200 in FIG. 2 is configured to carry out this method.

Figure 4:
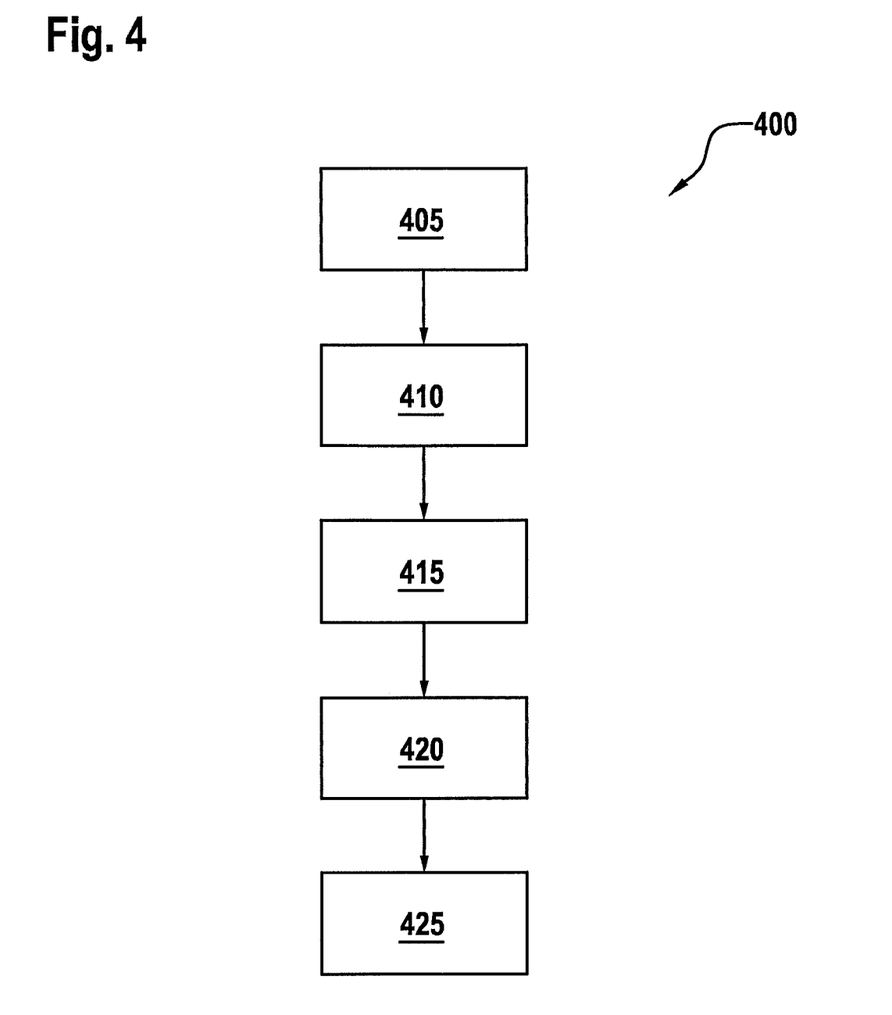
FIG. 4 shows a flow chart of a method on board the motor vehicle of FIG. 1.

FIG. 4 shows a flow chart of a method on board motor vehicle 102 of FIG. 1. In a first step 405, starter 115 in vehicle electrical system 100 of motor vehicle 102 is operated in series with limiting resistor 110.

In a following step 410, voltage values U_in and U_out are determined at limiting resistor 110. For this purpose, it is awaited until inductive effects in circuit 140 have decayed. U_out is then determined, on the basis of which resistances are determined in the output circuit, which is composed of limiting resistor 110, second line 125, and starter 115. To determine resistances in the input circuit, which is composed of battery 105 and first line 120, two measurements of U_in are also carried out at a predetermined time interval after the decay of the inductive effects in circuit 140. The first of these measurements may be carried out simultaneously with the determination of U_out.

On the basis of the measurements, in a first step 415, a threshold value for the current flowing through limiting resistor 110 is determined. Subsequently, in a step 420, the current flowing through limiting resistor 110 is determined continuously on the basis of simultaneous determinations of U_in and U_out, for which purpose the difference of U_in and U_out is divided by the resistance value of limiting resistance 110.

If the determined current falls below the previously determined threshold value, in a step 425, limiting resistance 110 is reduced and starter 115 is operated in series with reduced limiting resistance 110 at battery 105. Due to the way in which threshold value is determined in step 415, it is ensured that voltage U_Sternpkt applied to battery 105 does not drop below a predetermined voltage upon the reduction of limiting resistance 110. Method 400 is then terminated.

What is claimed is:

1. A method for maintaining a predetermined vehicle system voltage in a battery-supported vehicle electrical system during operation of an electrical starter included in the vehicle electrical system, the method comprising:
    during a first phase:
        operating the electrical starter on the vehicle electrical system in series with a first limiting resistance of a limiting resistor to limit current flowing through the starter; and
        determining a threshold value;
    initiating a transition to a second phase when the current flowing through the limiting resistor falls below the threshold value, wherein the transition is performed based on electrical parameters sampled during the first phase at the limiting resistor; and
    during the second phase, operating the electrical starter on the vehicle electrical system with a second limiting resistance of the limiting resistor which is lower than the first limiting resistance to increase a power converted by the starter.

2. The method as recited in claim 1, wherein:
    the threshold value is determined as a value which is no greater than $$I_1 \frac{R_K + R_2}{R_K + R_1};$$

$I_1$ is the current flowing during the first phase;
    $R_K$ is the sum of ohmic resistances in a circuit which includes a battery of the vehicle electrical system, a first line from the battery to the limiting resistor, a second line from the limiting resistor to the starter, and the starter;
    $R_1$ is the first limiting resistance; and
    $R_2$ is the second limiting resistance.

3. The method as recited in claim 2, wherein $R_K$ is determined as follows:
    determining voltages at both terminals of the limiting resistor at a first point in time;
    determining the sum of the resistances of the battery and the first line leading from the battery to the limiting resistor on the basis of the voltages determined at the first point in time;
    determining voltages at both terminals of the limiting resistor at second and third points in time which are different from one another; and
    determining the sum of the resistances of the second line leading from the limiting resistor to the starter and of the starter on the basis of the voltages determined at the second and third points in time.

4. The method as recited in claim 3, wherein, at the first point in time, inductive influences in the area of the battery and the first line have decayed and a rotational speed of the starter is so low that an electromotive counter force of the starter is negligibly small.

5. The method as recited in claim 3, wherein the third point in time is so far beyond the second point in time that currents flowing through the limiting resistor differ significantly from one another at the second and third points in time.

6. The method as recited in claim 3, wherein at least a fourth voltage is determined at a fourth point in time at the two terminals of the limiting resistor, and the determination of the sum of the resistances of the second line leading from the limiting resistor to the starter and of the starter takes place on the basis of the voltages determined at the second, third, and fourth points in time.

7. The method as recited in claim 1, further comprising:
   determining a triggering point in time on the basis of voltage measurements at the limiting resistor during the first phase; and
   initiating the second phase when the determined triggering point in time is reached.

8. The method of claim 1, wherein in the first phase, a load current draw is limited so that the voltage does not drop below a minimum predetermined value.

9. The method of claim 1, wherein the threshold value is determined on the basis of the sampled electrical parameters.

10. A device for maintaining a predetermined voltage in a battery-supported vehicle electrical system during operation of an electrical starter which is included in the vehicle electrical system, the device comprising:
   a controllable limiting resistor for operating on the vehicle electrical system in series with a limiting resistance of the limiting resistor;
   a first sampling unit and a second sampling unit for recording voltages at different terminals of the limiting resistor;
   a timer; and
   a control unit which selectively varies the limiting resistance, wherein:
      during a first phase:
         the electrical starter is operated on the vehicle electrical system in series with a first limiting resistance of the limiting resistor to limit current flowing through the starter; and
         a threshold value is determined;
      a transition to a second phase is initiated when the current flowing through the limiting resistor falls below the threshold value;
      the transition is performed based on electrical parameters sampled by the sampling units during the first phase at the limiting resistor; and
      during a second phase, the electrical starter is operated on the vehicle electrical system with a second limiting resistance of the limiting resistor lower than the first limiting resistance to increase a power converted by the starter.

11. The device of claim 10, wherein in the first phase, a load current draw is limited so that the voltage does not drop below a minimum predetermined value.

12. The device of claim 10, wherein the threshold value is determined on the basis of the sampled electrical parameters.

13. A method for controlling a vehicle system voltage in a battery-supported vehicle electrical system during operation of an electrical starter which is included in the vehicle electrical system, the method comprising:
   operating the electrical starter in a first phase in which a load current draw is limited so that the voltage does not drop below a minimum predetermined value; and
   in response to current flowing through a limiting resistor falling below a threshold value, transitioning to operating the electrical starter in a second phase in which the electrical starter is operated in a manner that is different than the operation of the electrical starter in the first phase.

14. A device for controlling a voltage in a battery-supported vehicle electrical system during operation of an electrical starter which is included in the vehicle electrical system, the device comprising:
   a limiting resistor; and
   a control unit;
   wherein the control unit is configured to:
      operate the electrical starter in a first phase in which a load current draw is limited so that the voltage does not drop below a minimum predetermined value; and
      in response to current flowing through the limiting resistor falling below a threshold value, transition to operating the electrical starter in a second phase in which the electrical starter is operated in a manner that is different than the operation of the electrical starter in the first phase.

* * * * *